United States Patent
Kehne et al.

(10) Patent No.: US 7,624,312 B2
(45) Date of Patent: *Nov. 24, 2009

(54) SYSTEM, APPARATUS, COMPUTER PROGRAM PRODUCT FOR PERFORMING OPERATIONAL VALIDATION WITH LIMITED CPU USE OF A COMMUNICATIONS NETWORK

(75) Inventors: Kevin Gene Kehne, Austin, TX (US); Claudia Andrea Salzberg, Austin, TX (US); Steven Joseph Smolski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/131,068

(22) Filed: May 31, 2008

(65) Prior Publication Data

US 2008/0228966 A1   Sep. 18, 2008

Related U.S. Application Data

(63) Continuation of application No. 11/032,179, filed on Jan. 10, 2005, now Pat. No. 7,392,441.

(51) Int. Cl.
    *H03M 13/00* (2006.01)
(52) U.S. Cl. .................. 714/709; 714/6; 714/30; 714/31
(58) Field of Classification Search ............ 711/146; 717/128; 713/169; 714/724, 709, 30, 6
See application file for complete search history.

(56) References Cited

U.S. PATENT DOCUMENTS

| 4,654,819 A | 3/1987 | Stiffler et al. |
|---|---|---|
| 5,659,709 A | 8/1997 | Quach |
| 5,727,144 A | 3/1998 | Brady et al. |
| 5,996,091 A | 11/1999 | Jones et al. |
| 6,321,307 B1 * | 11/2001 | Maguire et al. ............ 711/146 |
| 6,772,310 B2 | 8/2004 | Thompson et al. |
| 6,928,638 B2 | 8/2005 | Parvathala et al. |
| 7,003,628 B1 * | 2/2006 | Wiedenman et al. ........ 711/118 |
| 7,111,175 B2 | 9/2006 | Ripley |
| 7,216,185 B2 | 5/2007 | Kato |
| 7,231,562 B2 | 6/2007 | Ohlhoff et al. |

(Continued)

*Primary Examiner*—David Ton
(74) *Attorney, Agent, or Firm*—Matthew B. Talpis; Munsch Hardt Kopf & Harr, P.C.

(57) ABSTRACT

A system, apparatus, computer program product and method of performing operational validation on a system are provided. The system may include a CPU with a cache, a communications network, and a plurality of devices exchanging data during a test. When the test is ready to be performed, the CPU may set up a pool of buffers in the cache. The pool of buffers may generally have a set of locations corresponding to locations in an actual destination buffer and a set of locations corresponding to locations in an actual source buffer. During the performance of the test, data is exchanged over the communications network to and from the source and destination buffers. Snooping logic in the cache may snoop data on the communications network. The data snooped may be entered in appropriate locations in the pool of buffers. This allows the CPU to perform operational validation by using cached data instead of data that is in the actual source and destination buffers.

15 Claims, 4 Drawing Sheets

U.S. PATENT DOCUMENTS

| | | |
|---|---|---|
| 7,266,693 B1 | 9/2007 | Potter et al. |
| 7,346,735 B2 * | 3/2008 | Peri et al. .................. 711/118 |
| 2004/0015880 A1 | 1/2004 | Floyd et al. |
| 2006/0168476 A1 | 7/2006 | Kehne et al. |
| 2007/0012998 A1 * | 1/2007 | Miura et al. ................ 257/331 |

* cited by examiner

SYSTEM, APPARATUS, COMPUTER PROGRAM PRODUCT FOR PERFORMING OPERATIONAL VALIDATION WITH LIMITED CPU USE OF A COMMUNICATIONS NETWORK

RELATED APPLICATIONS

This application is a continuation of U.S. patent application Ser. No. 11/032,179, filed Jan. 10, 2005, entitled "METHOD OF PERFORMING OPERATIONAL VALIDATION WITH LIMITED CPU USE OF A COMMUNICATIONS NETWORK", now U.S. Pat. No. 7,392,441, which is hereby incorporated by reference herein.

BACKGROUND OF THE INVENTION

1. Technical Field

The present invention is directed to post-silicon system-on-chip (SOC) operational validation. More specifically, the present invention is directed to an apparatus, system, computer program product and method of performing post-silicon validation with limited CPU use of a communications network.

2. Description of Related Art

An SOC is a semiconductor device (i.e., a chip) that includes all necessary hardware and electronic circuitries for a complete computer system. That is, an SOC may include on-chip memory, one or more microprocessors or CPUs (central processing units), peripheral interfaces, input/output (I/O) logic control, communications network, data converters etc. Generally, each group of hardware and electronic circuitries that performs a particular function in an SOC is referred to as a core. Thus, the CPUs, the I/O logic control, the data converters etc. may each be referred to as a core.

As with any semiconductor device, pre-silicon (i.e., before semiconductor fabrication) functional verification, and post-silicon (i.e., after semiconductor fabrication) operational validation are critical to the functional and operational quality of the device. This is especially true for an SOC device in which one defect may cause the failure of the entire device.

As is well known in the field, pre-silicon functional verification testing is time-consuming and is inherently un-encompassing (i.e., not every possible condition can be tested). Consequently, "bugs" may remain undetected in the SOC after pre-silicon functional verification testing has been performed. Note that the "bugs" may be due to misinterpretations of functional requirements as well as to incorrect assumptions during design. Further, bugs that are due to workmanship and materiel defects may be introduced during fabrication. Consequently, it is essential that exhaustive post-silicon functional validation tests be performed on an SOC. The tests should preferably include interactions by the cores as well as with other peripherals and subsystems.

One of the post-silicon functional validation tests that is rather important for an SOC is load stressing. In a load stressing test, the CPU or one of the CPUs (if there is a plurality of CPUs in the SOC) may coordinate execution of tests by the cores and validate the results of the tests. The tests may concurrently be executed by the cores. During the execution of the tests, the cores may interact with each other and thus may have to contend for the use of the communications network. Further, in coordinating the execution of the tests and validating the tests, the CPU may also contend for the use of the communications network as well as use the communications network. Having the CPU use the communications network when it is needed by the cores during the execution of the tests reduces the parallelism aspect of the tests. In addition, the desired test coverage of multi-core interaction and communications network contention may suffer.

Thus, what is needed is an apparatus, system, computer program product and a method of performing post-silicon validation with limited CPU use of a communications network.

SUMMARY OF THE INVENTION

The present invention provides a system, apparatus, computer program product and method of performing operational validation on a system with limited central processing unit (CPU) use of a communications network. The system may include a CPU with a cache, a communications network, and a plurality of devices exchanging data during a test. When the test is ready to be performed, the CPU may set up a pool of buffers in the cache. The pool of buffers may generally have a set of locations corresponding to locations in an actual destination buffer and a set of locations corresponding to locations in an actual source buffer. After the pool of buffers has been set up, the test may commence. During the performance of the test, data will be exchanged over the communications network to and from the source and destination buffers. The cache, which may contain snooping logic, may snoop the communications network during the data exchange. The data snooped may be entered in appropriate locations in the pool of buffers. When the CPU is to perform operational validation, the CPU may use the cached data instead of data that may be in the actual source and destination buffers in the system. Thus, the communications network need not be used by the CPU to conduct the validation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
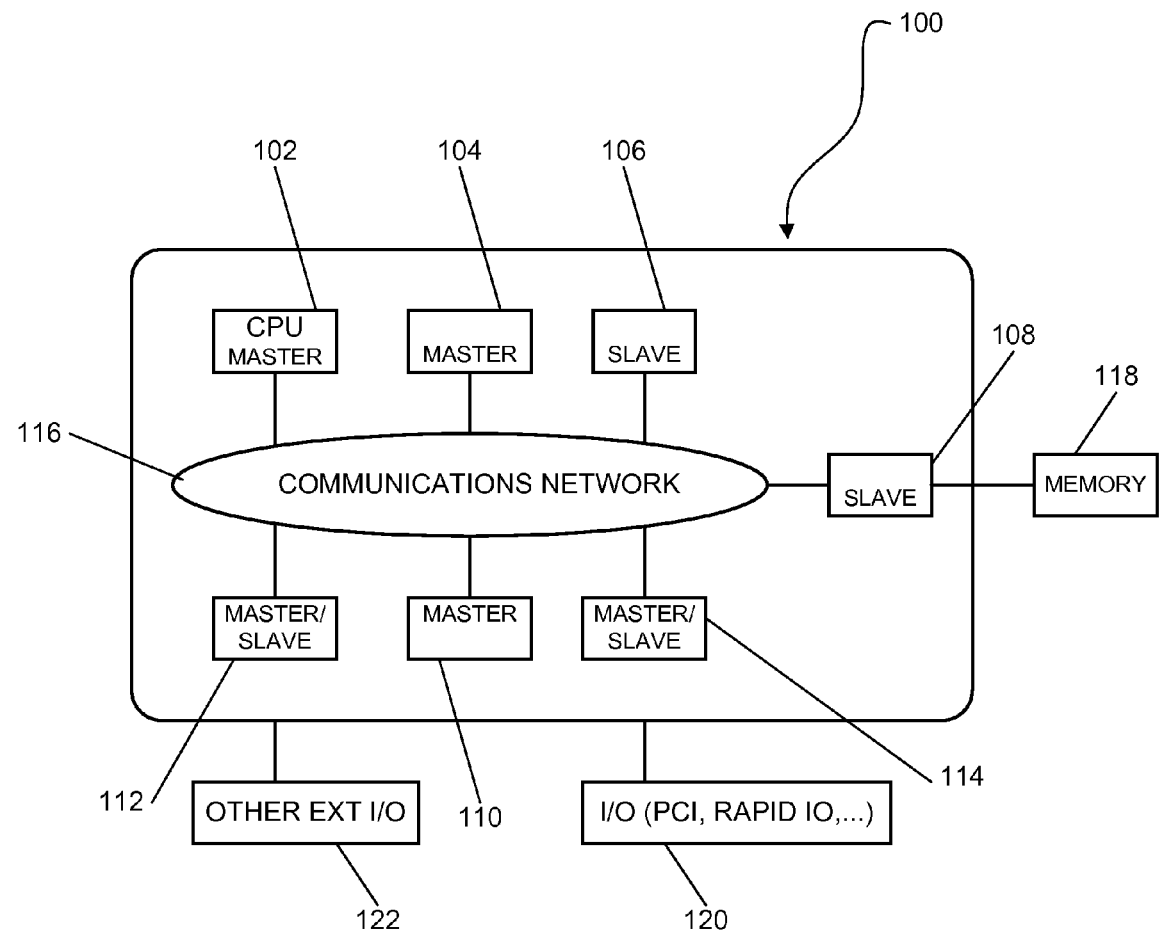
FIG. 1a depicts an exemplary representation of an SOC.

With reference now to the figures, FIG. 1a depicts an exemplary representation of an SOC 100. The SOC 100 includes a CPU 102, two master cores (cores 104 and 110), two slave cores (cores 106 and 108) and two master/slave cores (cores 112 and 114) connected to each other via communications network 116. A master core is a core that is capable of initiating data transfer on the communications network 116 and a slave core is a core that is capable of being a target of a data transfer. Thus, CPU 102 is a master core.

Some cores are capable of being both masters and slaves (e.g., master/slave cores 112 and 114) while others can be one or the other exclusively. For example, cores 102, 104 and 110 can only be masters and cores 106 and 108 can only be slaves.

Some cores provide bridges to interfaces that are external to the SOC 100 and others do not. For example, slave core 108 and master/slave cores 112 and 114 are connected to an external memory subsystem 118 and I/O subsystems 122 and 120, respectively via an external interface (not shown), while the other cores (i.e., cores 104, 106 and 110) are not connected to any external subsystem. The externalized interfaces allow for usage of test equipment that is unique to the given interface and allow for some independent validation of functionality. None of the externalized interfaces, however, are capable of providing overall coordination, setup and validation of tests. This task is reserved for the CPU 102.

As mentioned before, the CPU 102 may set up tests that are to be performed by the cores. In doing so, the CPU 102 may pair master cores with slave cores, initialize buffers in which data is to be transferred, validate the buffers (i.e., validate data transferred to and from the slave cores by the master cores) etc. To validate the buffers, the CPU 102 may have to read the source and destination buffers and perform comparison operations. This can be a rather time-intensive endeavor and obviously requires the use of the communications network. Thus, while the CPU 102 is validating the buffers, the master cores will have to remain idle waiting for the communications network to become available. Stated differently, the master cores may contend for and use the communications network during very short intervals of time when the CPU 102 is not performing buffer validation. Obviously, this greatly reduces the likelihood of finding contention and interaction problems that may occur during heavy concurrent uses of the communications network by multiple master-slave pairs.

One approach that has been taken to increase the likelihood of finding contention and interaction problems is to either skip buffer validation altogether or to perform buffer validation on a selective basis. If buffer validation is not performed, then only protocol or parity errors will be detected on the communications network. If buffer validation is performed on a selective basis, some contention and interaction errors that would ordinarily be detected under general load stressing tests will be missed. Further, the circumstances that may prompt the errors may not be isolated.

Another approach that has been taken to increase the likelihood of finding contention and interaction problems is to move the control of the tests from the CPU 102 to an external device. The external device may use the CPU 102 to validate some of the data transfers as well as use special test equipment on the various externalized slave interfaces. However, although this approach may potentially increase the likelihood of finding contention and interaction problems with some master-slave pairs, it introduces a greater level of complexity as well as implementation costs.

Figure 1B:
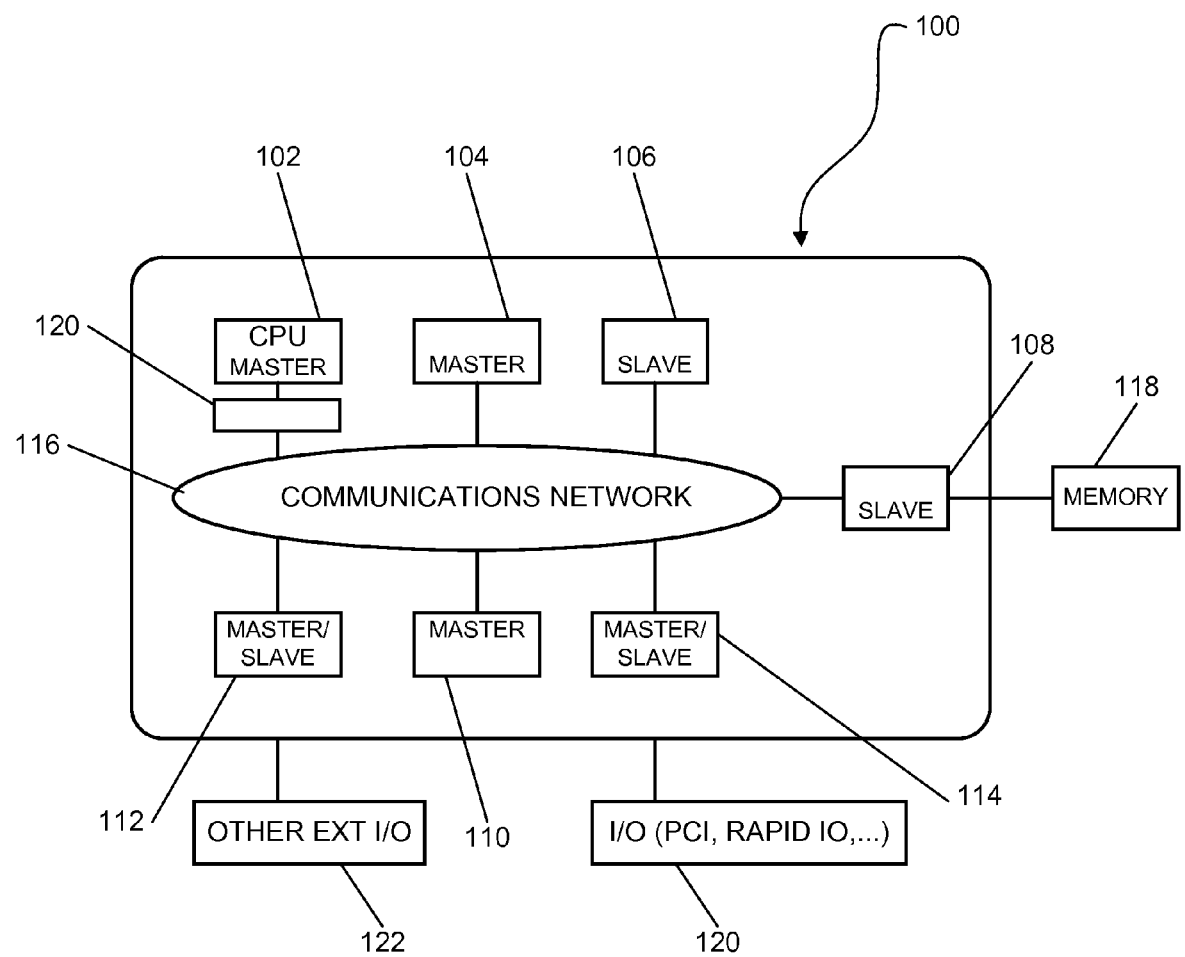
FIG. 1b depicts the SOC of FIG. 1a with an integrated L1 cache.

The approach used in the present invention is to cache both the source and destination buffers in an L1 and/or L2 cache of the CPU 102. For example, in FIG. 1b, the CPU 102 is shown to have an integrated L1 cache 120. The L1 cache 120 may generally have snooping logic to provide data or hardware (HW) coherency. That is, the cache 120 may watch its address and data bus continuously while it is held off the bus, comparing every address driven by a bus master with its internal cache tags and optionally updating its cached lines.

In accordance with the invention, the CPU 102 may maintain a pool of buffers (e.g., source and destination buffers) for each master-slave pair in its cache. Furthermore, the CPU 102 may initialize a memory map such that the address ranges for the buffer pools are cacheable. The HW coherency/snooping logic will ensure that as various masters perform data transfers on the communications network that an up-to-date copy is maintained in the cached pools of buffers. The CPU 102 may then perform validation on the cached copy of the used/dirty buffer pool entries for a given master-slave pair concurrently with the master-slave pair using a new/clean buffer pool entry.

Figure 2:
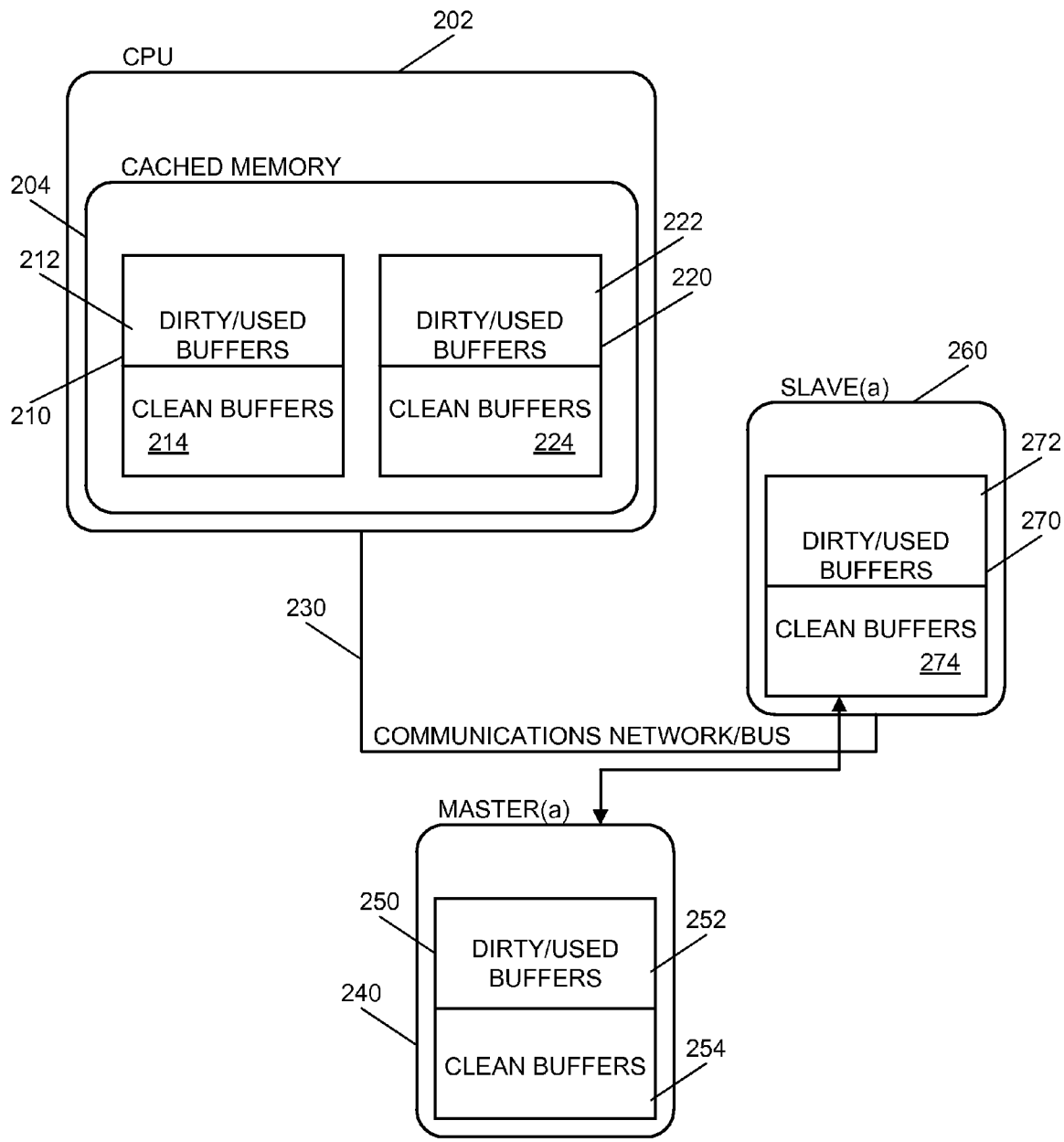
FIG. 2 depicts a conceptual view of one pool of buffers in the cache of the CPU.

FIG. 2 depicts a conceptual view of one pool of buffers in the cache of the CPU 102. Note that although one pool of buffers is shown, the invention is not thus restricted. The cache will generally contain as many pools of buffers as there are master-slave pairs. Thus, the display of only one pool of buffers is for illustrative purposes only.

As mentioned above, each cached pool of buffers contains a source buffer and a destination buffer assigned to a master/slave pair. Master(a) 240 is shown to be paired off with slave(a) 260 in FIG. 2. Buffer 210 in cached memory 204 which contains dirty/used buffer locations 212 and clean buffer locations 214 may correspond to buffer 250 in master (a) 240. As can be seen from the figure, buffer 250 contains dirty/used buffer locations 252 and clean buffer locations 254. Buffer 220 in cached memory 204 which contains dirty/used buffer locations 222 and clean buffer locations 224 may correspond to buffer 270 in slave(a) 260. As with buffer 250 in master(a) 240, buffer 270 in slave(a) 260 contains dirty/used buffer locations 272 and clean buffer locations 274.

Master(a) 240 uses communications network 230 to transfer data to and from slave(a) 260. New data is written into clean buffer areas 254 and/or 264 of buffers 250 and 260. Once an area has been written into, it becomes part of dirty/used areas 252 and/or 272. Modified data replaces data in the used/dirty areas 252 and 272.

As mentioned before, the HW coherency/snooping logic of cache 120 ensures that the cached pools of buffers contain identical data as buffers in the respective master/slave pairs by snooping the communications network 230. This then allows the CPU 102 to perform complete buffer validations on the cached pools of buffers while the various master-slave pairs continue to contend for and use the communications network without buffer validation interruptions from the CPU 102.

Figure 3:
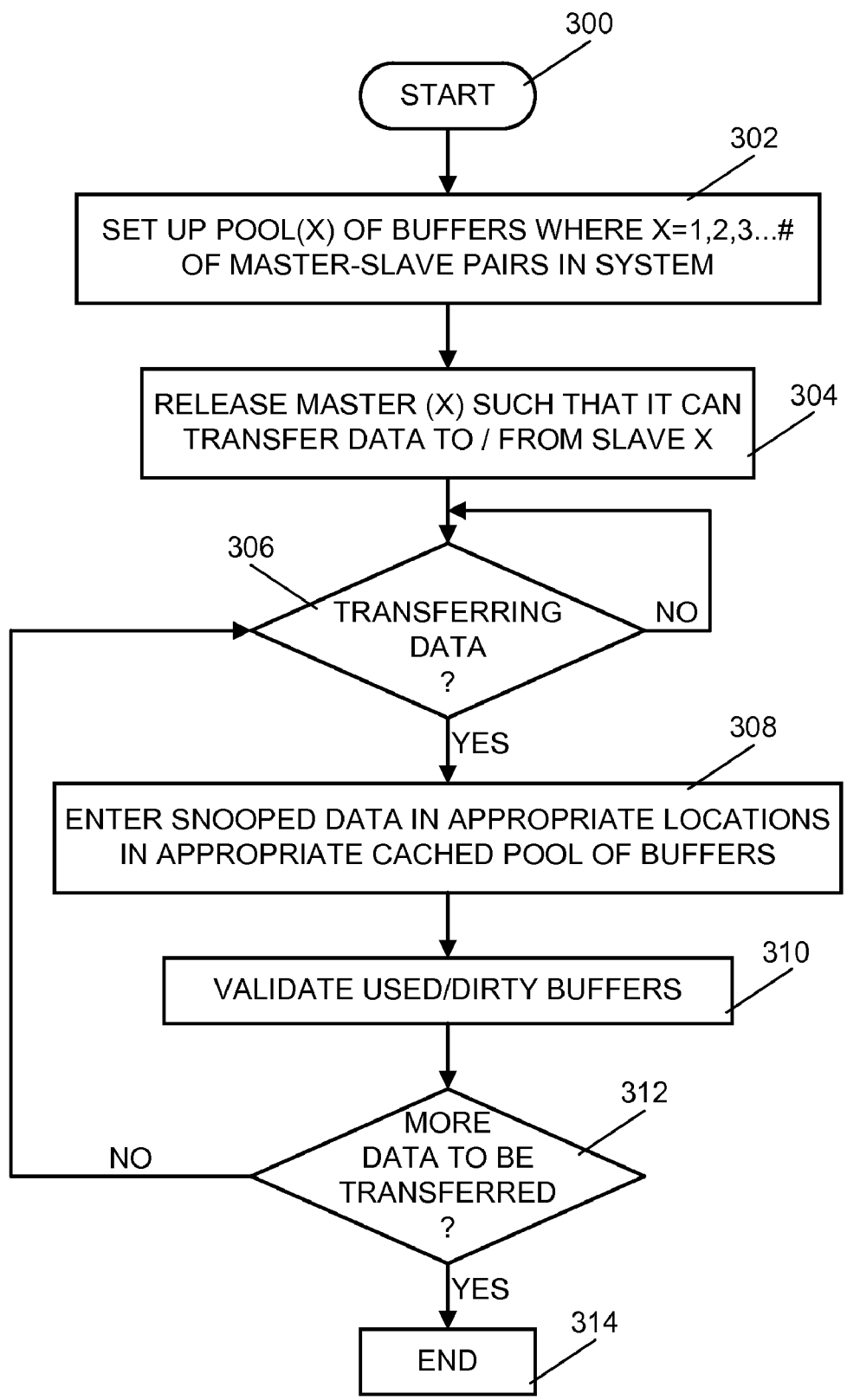
FIG. 3 is a flowchart of a process that may be used to implement the invention.

FIG. 3 is a flowchart of a process that may be used to implement the invention. The process starts when a test, such as a stress loading test, is initiated (step 300). The CPU then set up a pool of buffers for each master-slave pair that will be involved in the test (step 302). After setting up the pools of buffers, the CPU releases each master such that the master may transfer data to/from its respective slave (step 304). After the master is released, a test is continually performed to determine whether data is being transferred (step 306). If so, the HW coherency/snooping logic of the cache reads the data from the communications network and enters the data in the proper locations of the cached pools of buffers (step 308). The data is then validated (step 310). If there is more data being transferred as indicated by the test in decision box 312, the process jumps back to step 306; otherwise the process ends (step 314).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product on a computer readable medium for performing operational validation on a system, the system including a central processing unit (CPU) with a cache, a communications network, and at least a first device and a second device exchanging data during a test, the computer program product comprising:

code means for setting up, by the CPU, a pool of buffers in the cache, the pool of buffers having a set of locations assigned to the first device and a set of locations assigned to the second device, the CPU being used for the operational validation;

code means for snooping each piece of data being transferred on the communications network by the first device and the second device, each piece of data snooped being entered in appropriate locations in the pool of buffers; and code means for validating each transferred piece of data using the data in the pool of buffers.

2. The computer program product of claim 1 wherein the system is a system-on-chip (SOC) and the operational validation is post-silicon operational validation.

3. The computer program product of claim 2 wherein the first device and the second device are a master/slave pair of devices.

4. The computer program product of claim 3 wherein the test is a stress test.

5. The computer program product of claim 1 wherein the validation code means includes code means for reading data from locations assigned to the first device, reading data from corresponding locations assigned to the second device and comparing the data read from the locations assigned to the first device with the data read from the locations assigned to the second device, the data being validated if they are the same.

6. An apparatus for performing operational validation on a system, the system including a central processing unit (CPU) with a cache, a communications network, and at least a first device and a second device exchanging data during a test, the apparatus comprising:

means for setting up, by the CPU, a pool of buffers in the cache, the pool of buffers having a set of locations assigned to the first device and a set of locations assigned to the second device, the CPU being used for the operational validation;

means for snooping each piece of data being transferred on the communications network by the first device and the second device, each piece of data snooped being entered in appropriate locations in the pool of buffers; and means for validating each transferred piece of data using the data in the pool of buffers.

7. The apparatus of claim 6 wherein the system is a system-on-chip (SOC) and the operational validation is post-silicon operational validation.

8. The apparatus of claim 7 wherein the first device and the second device are a master/slave pair of devices.

9. The apparatus of claim 8 wherein the test is a stress test.

10. The apparatus of claim 6 wherein the validation mean includes means for reading data from locations assigned to the first device, reading data from corresponding locations assigned to the second device and comparing the data read from the locations assigned to the first device with the data read from the locations assigned to the second device, the data being validated if they are the same.

11. A system including a central processing unit (CPU) with a cache, a communications network, and at least a first device and a second device exchanging data during a test, the system comprising:

at least one storage device for storing code data; and at least one processor for processing the code data to set up, by the CPU, a pool of buffers in the cache, the pool of buffers having a set of locations assigned to the first device and a set of locations assigned to the second device, the CPU being used for the operational validation, to snoop each piece of data being transferred on the communications network by the first device and the second device, each piece of data snooped being entered in appropriate locations in the pool of buffers, and to validate each transferred piece of data using the data in the pool of buffers.

12. The system of claim 11 wherein the system is a system-on-chip (SOC) and the operational validation is post-silicon operational validation.

13. The system of claim 12 wherein the first device and the second device are a master/slave pair of devices.

14. The system of claim 13 wherein the test is a stress test.

15. The system of claim 11 wherein the code data is further processed to read data from locations assigned to the first device, to read data from corresponding locations assigned to the second device and to compare the data read from the locations assigned to the first device with the data read from the locations assigned to the second device, the data being validated if they are the same.

* * * * *